Aug. 15, 1967 W. H. SCHWARTZ 3,335,464
INJECTION MOLDING MACHINE
Filed March 3, 1965 5 Sheets-Sheet 1
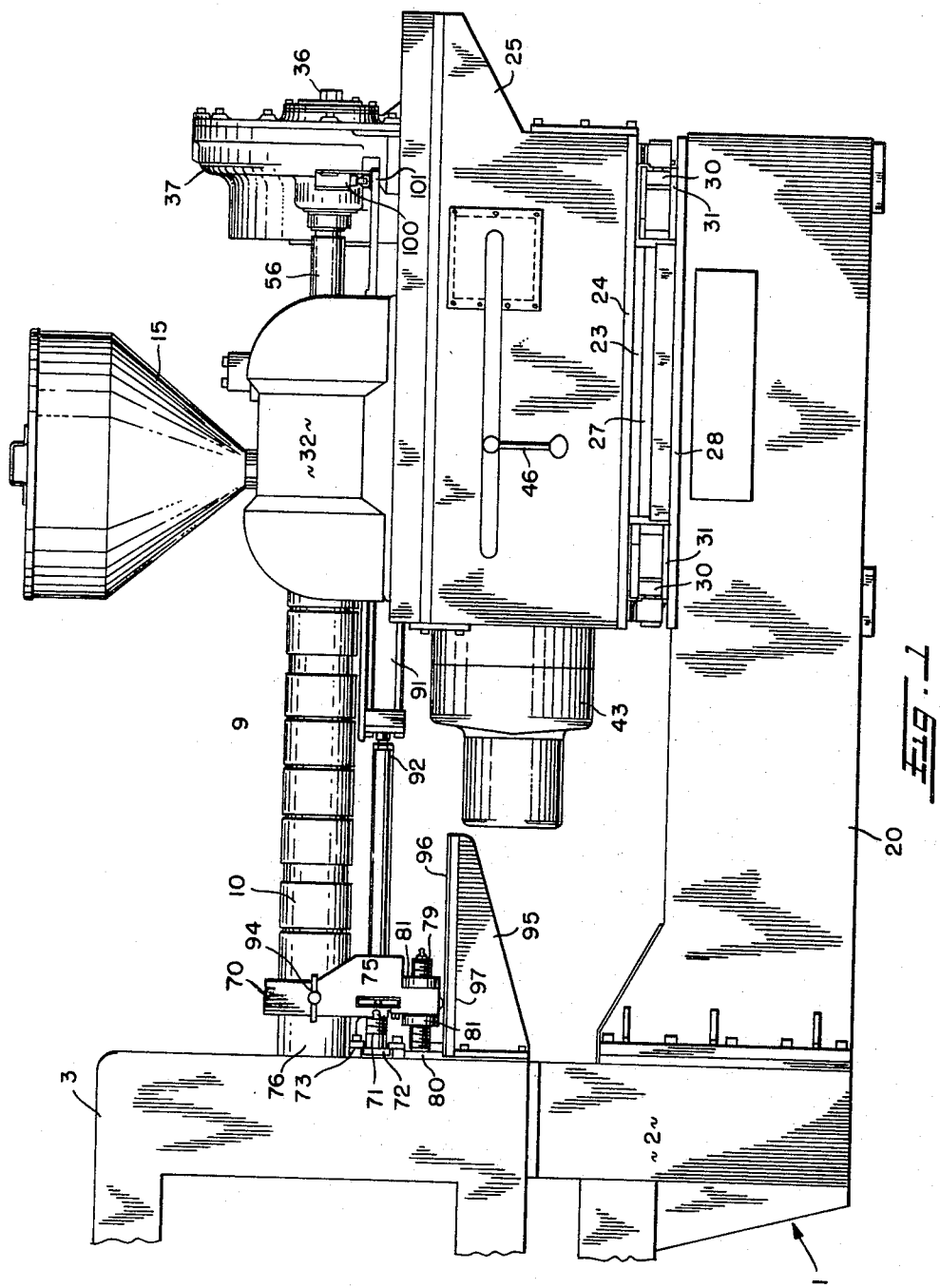
INVENTOR.
WILLIAM H. SCHWARTZ
BY
Oberlin, Maky & Donnelly
ATTORNEYS

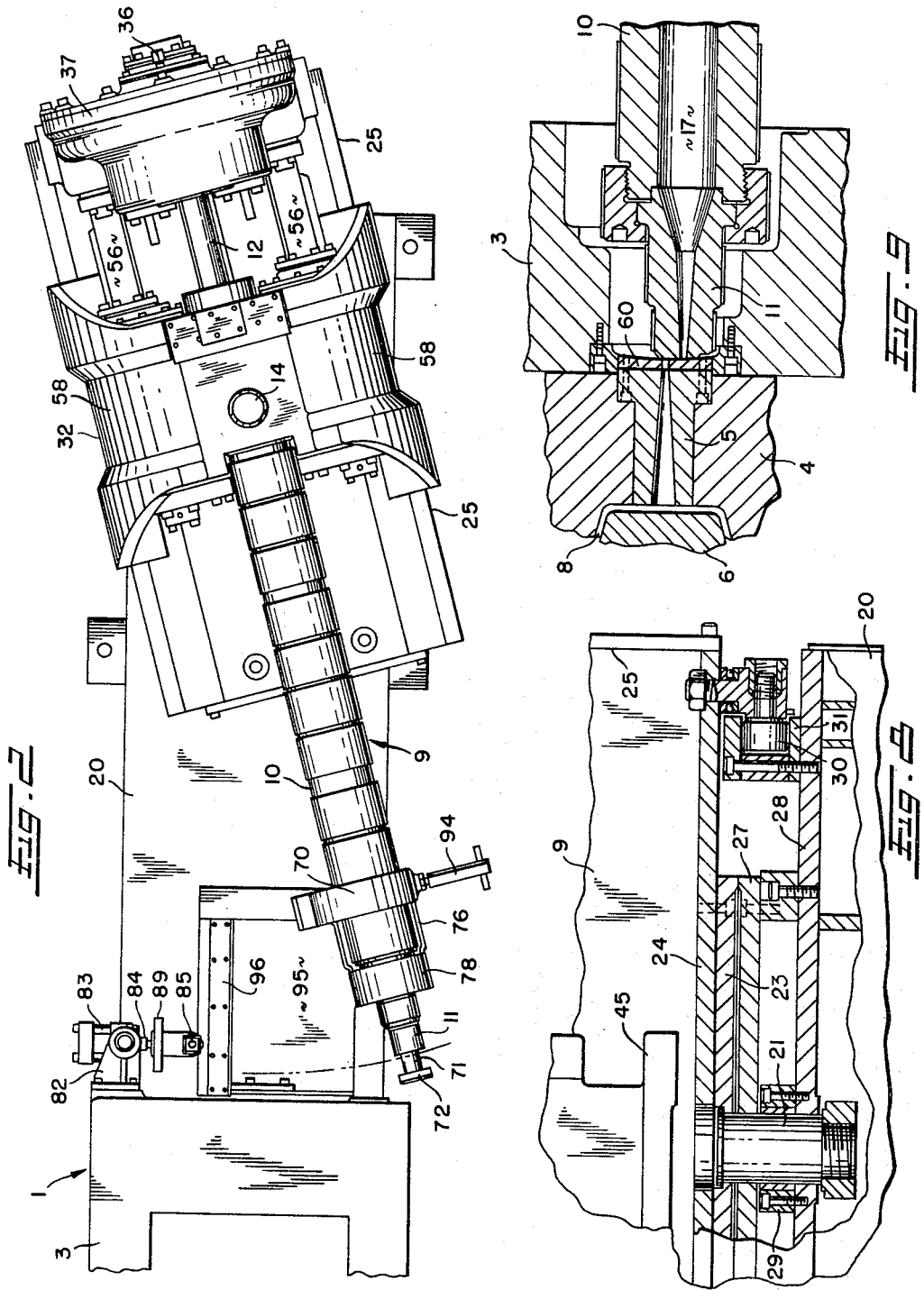

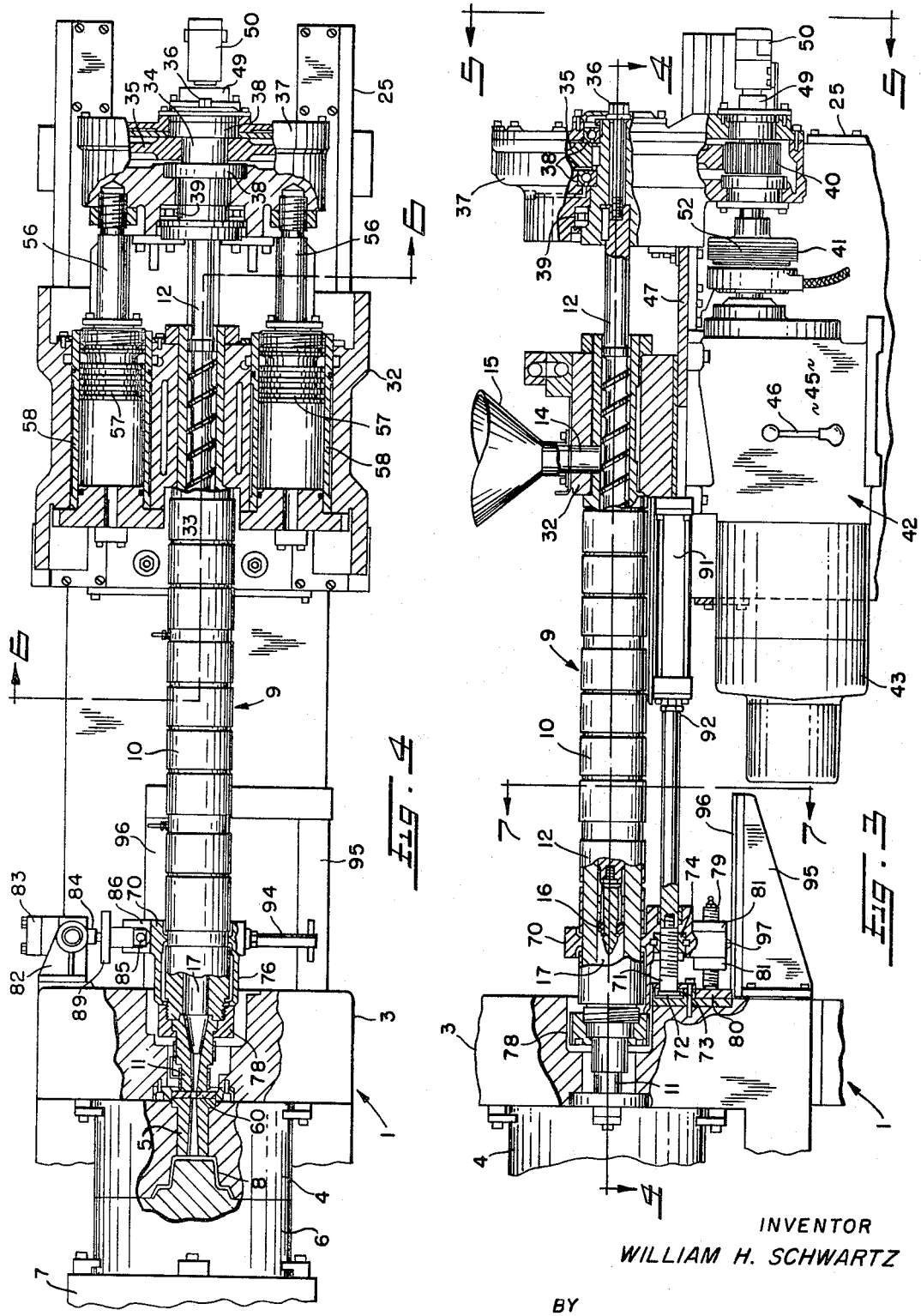

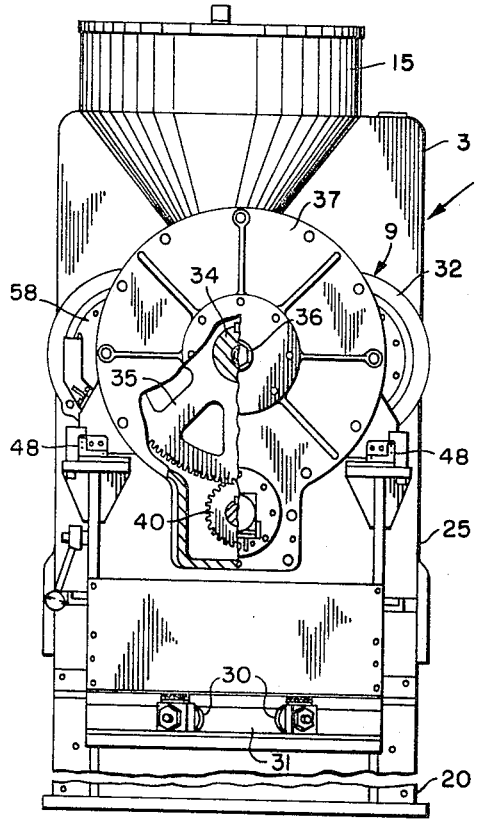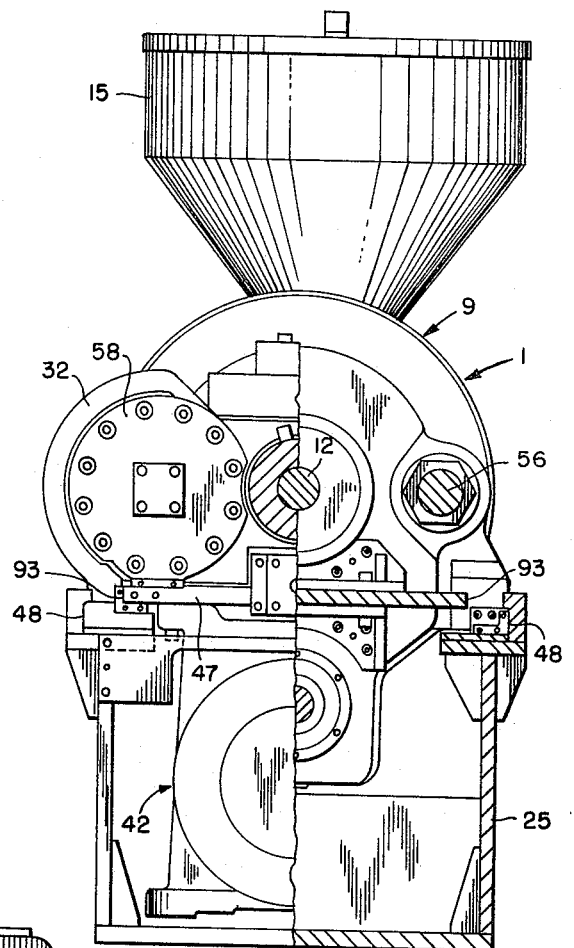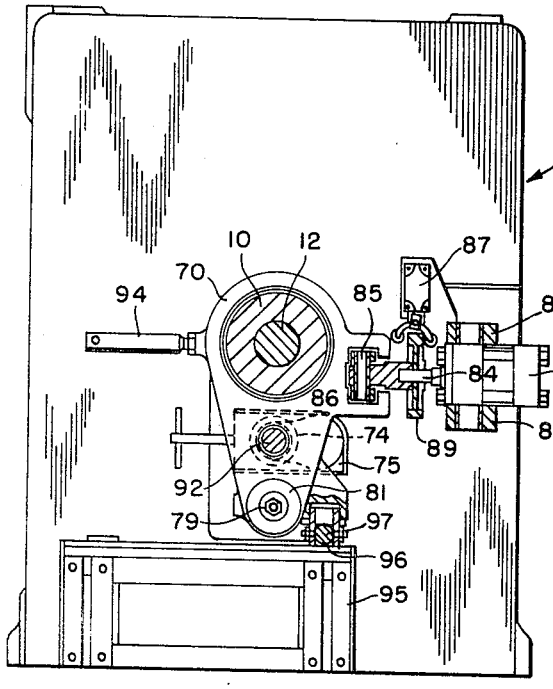

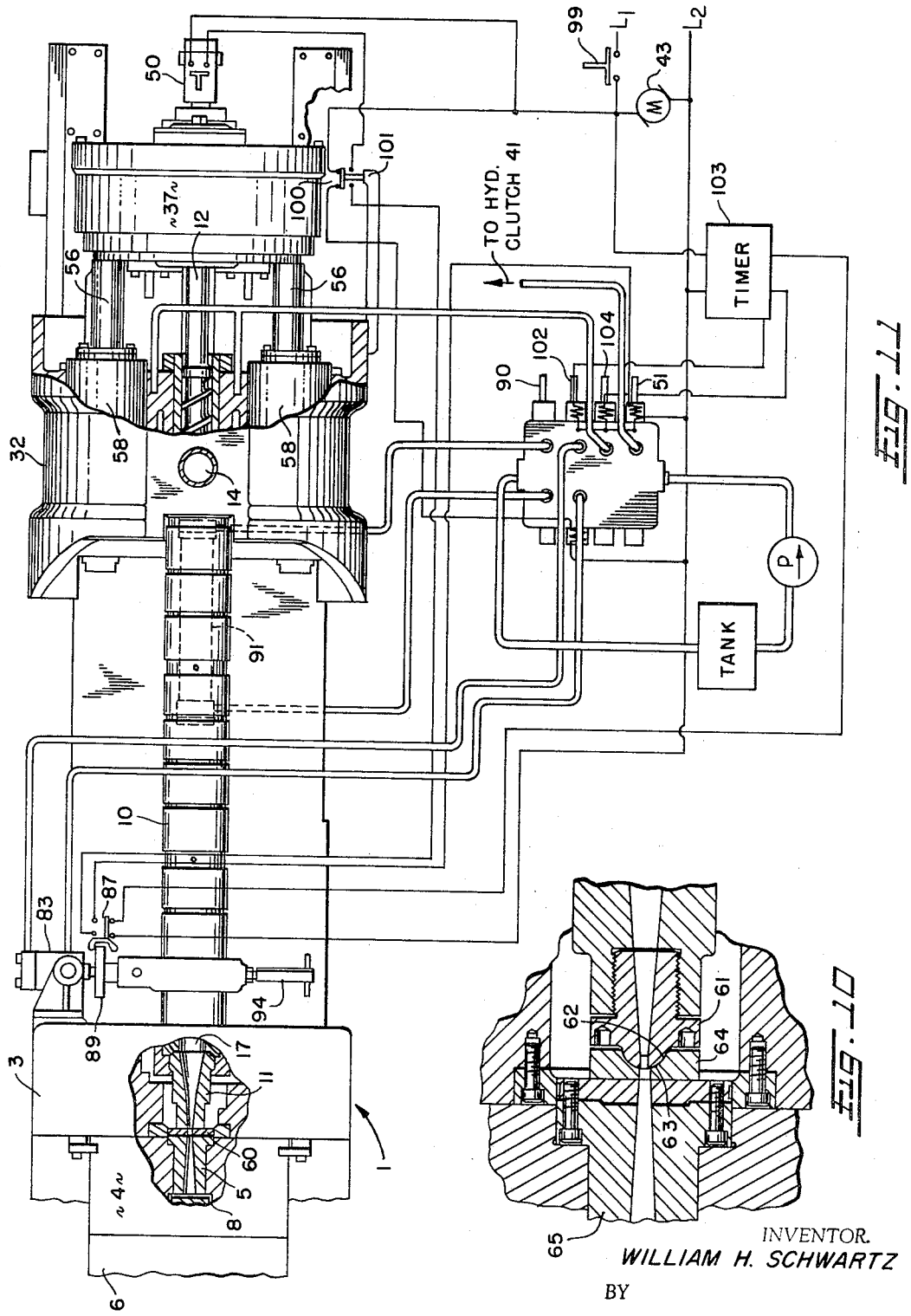

United States Patent Office 3,335,464
Patented Aug. 15, 1967

3,335,464
INJECTION MOLDING MACHINE
William H. Schwartz, University Heights, Ohio, assignor to Lester Engineering Company, Cleveland, Ohio, a corporation of Ohio
Filed Mar. 3, 1965, Ser. No. 436,784
8 Claims. (Cl. 18—30)

ABSTRACT OF THE DISCLOSURE

Reciprocating screw type injection molding machine characterized in that the injection cylinder in which the screw is reciprocated is pivotally mounted for movement of the injection nozzle out of register with the mold inlet opening when the screw is rotated and axially retracted in the cylinder and for movement of the nozzle into register with the mold inlet opening when the screw is axially advanced in the cylinder.

---

The present invention relates generally as indicated to an injection molding machine for plastic and like material and more particularly to an injection molding machine of the reciprocating screw type wherein a feed screw, as it is rotated and axially retracted in an injection cylinder, plasticizes the material therearound and feeds it to an injection chamber at the injection nozzle end of the cylinder wherefrom it is ejected upon axial advance of said feed screw.

It is one object of this invention to provide an injection molding machine of the character indicated in which the injection nozzle and the sprue bushing of the mold are relatively movable into register for injection of melted material from the injection chamber of the cylinder into a mold and out of register for removal of the molded article from the mold and for refilling the injection chamber preparatory to the succeeding injection stroke.

It is another object of this invention to provide an injection molding machine in which the injection cylinder has therein a reciprocating feed screw embodying check valve means in the head thereof, whereby as the screw is rotated and axially retracted with respect to the cylinder, plastic material around the feed screw is worked and melted and advanced through said check valve means into the enlarging cylinder chamber adjacent the injection nozzle and whereby, upon axial advance of the screw, said check valve means closes so that said feed screw operates as an injection plunger to displace the melted material from the cylinder chamber through the injection nozzle and into a mold cavity in register therewith.

It is another object of this invention to provide an injection molding machine of the character indicated in which both the feed screw and the injection cylinder are axially reciprocably carried by the machine for reciprocatory movements of the feed screw to perform its feeding and injection functions as above-stated and for retraction of the cylinder and feed screw assembly with respect to the mold to facilitate servicing of the injection nozzle and/or servicing or replacement of the feed screw. To that end, a related object is to additionally support the cylinder and feed screw assembly on the base or frame of the machine for lateral movement of at least the injection nozzle end of the cylinder so as to clear the frame and mold carried thereby for axial withdrawal of the feed screw from the machine from the injection end of the cylinder.

It is another object of this invention to provide a unitary injection cylinder and feed screw assembly on which are mounted the drive motor for the feed screw and motors for effecting reciprocatory movements of the feed screw and of the cylinder, said unitary structure, in turn, being bodily mounted on the frame or base of the machine.

It is another object of this invention to provide an injection molding machine of the character indicated in which overload of the feed screw drive motor is avoided with consequent avoidance of damage to said motor or of overloading the feed screw, or cylinder chamber, as the feed screw is being rotated and axially retracted to advance material in the injection end of the cylinder.

It is another object of this invention to provide a reciprocating screw type injection molding machine which is of compact size owing to disposition of the drive motor for rotating the feed screw beneath the feed screw and to disposition of the fluid motors for reciprocating the feed screw in straddling relation to the feed box of the injection cylinder.

It is another object of this invention to provide a novel sealing arrangement between the injection nozzle and the sprue bushing of the mold to prevent leakage of plastic material during the injection stroke when the nozzle and sprue bushing are aligned and during the injection chamber filling operation when the nozzle and sprue bushing are out of register with each other.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principle of the invention may be employed.

In said annexed drawings:

FIG. 1 is a side elevation view of a preferred embodiment of the present invention and for sake of simplification the mold and the means for separating the mold sections have been omitted, since these components are old and well known in the art;

FIG. 2 is a top plan view showing the injection cylinder retracted and moved to a position for ease of servicing the injection nozzle and of withdrawing the feed screw from that end of the cylinder upon removal of the injection nozzle;

FIG. 3 is a fragmentary side view partly in section showing the injection molding machine in operating position with the feed screw in retracted position ready to make its forward stroke to inject the melted plastic in the cylinder into a mold cavity;

FIG. 4 is a cross-section ivew taken substantially along the line 4—4, FIG. 3;

FIGS. 5, 6 and 7 are views taken substantially along the lines 5—5, FIG. 3, 6—6, FIG. 4, and 7—7, FIG. 3, respectively;

FIG. 8 is a fragmentary cross-section view on enlarged scale showing the pivotal mounting of the carirer frame for the injection cylinder and feed screw assembly;

FIG. 9 is a fragmentary cross-section view on enlarged scale of the injection nozzle end of the injection cylinder showing the out of registry position of the nozzle and sprue bushing preparatory to opening of the mold and removal of the molded article therefrom and filling of the cylinder chamber with melted plastic preparatory to the next injection stroke when the nozzle and sprue bushing are brought into register with one another, as shown in FIG. 4;

FIG. 10 is a fragmentary cross-section view showing another form of joint between the injetcion nozzle tip and the sprue bushing; and FIG. 11 is a schematic wiring and piping diagram for automatic operation of the present injection molding machine.

Referring now more particularly to the drawings, and first to FIGS. 1 to 4, the injection molding machine 1 as a whole comprises a main base 2 on which the die frame 3 is mounted, said mold frame 3 carrying, as best shown in FIG. 4, a fixed die block 4 having a sprue bushing 5 therein. The movable die block 6 is carried on a movable plate 7 and when said die blocks 4 and 6 are in engagement as shown in FIG. 4 a die cavity 8 is defined thereby adapted to be filled with melted plastic injected thereinto through the sprue bushing 5. The mechanism for moving the plate 7 and the die block 6 toward and away from the die block 4 may be of any conventiional type. See, for example, the patent to Nathan Lester, No. 2,475,394, dated July 5, 1949.

For melting plastic material and injecting the same into the cavity 8, there is herein provided a cylinder-feed screw assembly 9, the cylinder 10 having electric heating bands or the like therearound and having at one end an injection nozzle 11 which, in injecting position, registers with the sprue bushing 5 for flow of melted plastic material from within the cylinder 10 into the mold cavity 8. Rotatable and axially reciprocable in said cylinder 10 is a feed screw 12 which, when rotated, advances solid pellets, granules, or chips of plastic material toward the nozzle 11 from the feed opening 14 in the cylinder 10. A suitable hopper 15 is provided for feeding the plastic material to the feed opening 14. While the solid plastic material is thus advanced, it is compressed, heated, smeared, and melted by the rotating feed screw 12. In the present case, the tip of the feed screw 12 is equipped with check valve means 16 through which the melted plastic material flows as the feed screw is retracted while it is rotating to deposit the melted material into the axially enlarging cylinder chamber 17. Preferably, while the feed screw 12 is thus being retracted, the nozzle 11 will be in the cutoff position shown in FIG. 9 in which the nozzle 11 and sprue bushing 5 are out of register.

After the cylinder chamber 17 has been filled with sufficient melted plastic material to fill the mold cavity 8 the injection nozzle 11 is brought into regitser with the sprue bushing 5, (FIG. 4) whereupon the feed screw 12 when it is advanced axially toward the left as viewed in FIGS. 3 and 4 effects closing of the check valve means 16 in the tip thereof and operates as an injection plunger to inject the melted plastic material in chamber 17 into the mold cavity 8. For a detailed illustration of one form of reciprocating screw injection molding machine in which the feed screw is provided with check valve means reference may be had to the copending application of William H. Schwartz, Ser. No. 374,621, filed June 12, 1964. As in aforesaid copending application, the check valve means 16 herein shown, comprise cylindrical rollers which not only constitute check valve members, but additionally, function as roller bearings to maintain the feed screw 12 out of rubbing contact with the cylinder 10.

Having thus described in general the operation of the reciprocating screw injection molding machine 1 herein disclosed, reference will now be made to details of construction for effecting desired operation thereof. First of all, the base 2 of the machine has an extension base 20 on which the entire cylinder-feed screw assembly 9 is pivotally mounted for swinging movement about a vertical axis for movement of the injetcion nozzle 11 between the FIG. 4 and 9 positions and for swinging movement of the entire assembly to the FIG. 2 position. As best shown in FIG. 8, such pivotal mounting of the cylinder-feed screw assembly 9 comprises a downwardly projecting shaft 21 of a heavy plate 23 bolted on the bottom plate 24 of the carrier frame 25, said shaft 21 extending down through openings in vertically spaced apart plates 27 and 28 of the base extension 20 and an intermediate journal bearing 29. The bottom plate 24 of the carrier frame 25 also carries a plurality of radially disposed rollers 30 engaged in arcuate tracks 31 secured to the top of the base 20 thus to resist tilting moments which are greatest when the feed screw 12 is making its injection stroke and applying a pressure of 20,000 p.s.i. or more on the melted plastic material to inject it into the mold cavity 8. Preferably, there are a pair of such rollers 30 on each side (see FIG. 5).

The feed end of the cylinder 10 is mounted in a feed box 32 as shown in FIGS. 1 to 4, the latter having mounted thereon the feed hopper 15 from which the solid plastic material in the form of pellets, granules, or chips, gravitates through the feed opening 14 into the helical channel defined by the helical rib 33 of the feed screw 12. Said feed box 32 will be provided with cored passages (see FIG. 4) through which coolant is adapted to be circulated to prevent premature heating and sticking of the plastic material around the feed opening 14.

The feed screw 12 is keyed in the tubular drive hub member 34 of a drive gear 35 and retained therein by means of the screw 36, the drive member 34 being journalled in a gear housing 37 by radial bearings 38 and thrust bearing 39. The gear housing 37 has a drive pinion 40 journalled therein and is coupled through a hydraulically actuated clutch 41 to a drive unit 42 which comprises an electric drive motor 43 and a four-speed drive unit 45 with a speed selector lever 46. The drive unit 42 and gear housing 37 are secured to a plate 47 which is guided along its opposite sides in guideways 48 formed in the carrier 25 for movement of the drive unit 42 and gear housing 37 in unison as the feed screw 12 is retracted or advanced in the cylinder 10.

To prevent overloading of the drive unit 42 and the feed screw 12, the pinion drive shaft 49 has mounted thereon a centrifugal switch 50 which, when closed, operates a 3-way valve 51 (see FIG. 11) for supplying fluid under pressure into the hydraulic chuck 41, thus to frictionally engage the interleaving clutch plates 52 of which alternate ones are keyed on the output shaft of the drive unit 45 and the pinion shaft 49. When, however, there is excessive resistance to turning of the feed screw 12 the consequent reduction in speed of the pinion shaft 49 will cause the contacts of the centrifugal switch 50 to open, whereupon the valve 51 will vent the hydarulic clutch 41 so that torque will not be transmitted through the clutch 41 from the drive unit 45 to the pinion shaft 49, and thus the drive unit 42 will operate under substantially no load when there is more than a specified torque load on the feed screw 12.

As best shown in FIG. 4, the gear housing 37 has a pair of piston rods 56 secured thereto of which the pistons 57 are reciprocable in cylinders 58 formed in the feed box 32 and thus it can be seen that when fluid under pressure is admitted into the rod ends of said cylinders 58 the pistons 57 will move to the left to thus advance the feed screw 12 toward the left to make its injection stroke as previously explained. Cylinders 58 are of single-acting type but if desired fluid under pressure in the head ends may be used to retract the feed screw 12 in addition to back pressure of the plasticized material fed into chamber 17.

As previously explained, when the feed screw 12 is axially advanced toward the left in the cylinder 10, the injection nozzle 11 is aligned with the sprue bushing 5 whereby the melted plastic material is displaced from the cylinder chamber 17 into the mold cavity 8. Accordingly, when the plastic material in the mold cavity 8 and in the sprue bushing 5 has at least partly solidified, the die block 6 is moved away from die block 4 for withdrawal of the molded article. At that time, the nozzle 11 will be in the FIG. 9 position to prevent oozing or dripping of the plastic material, the tip of the nozzle 11 having a sliding sealed fit with a sprue insert member 60 secured by screws or the like onto the end face of the sprue bushing 5. As best shown in FIG. 9, the insert 60 and the tip of the nozzle 11 have complemental interengaged cylindrical faces whose axes coincide with the vertical axis of pivot shaft 21. Obviously these interengaged faces of insert 60 and the tip of the nozzle 11 may be spherical having centers similarly coinciding with the vertical axis of pivot shaft 21 and with the longitudinal axis of cylinder 10. A further modification is shown in FIG. 10 wherein the nozzle 61 has a spherical tip 62 which fits in a complemental spherical depression 63 in insert 64, the latter having a plane end face which firmly slidably engages the end face of sprue bushing 65. Thus, when the nozzle 61 is shifted about pivot shaft 21 to cutoff position, the spherical tip 62 will rock in depression 63 and cause the insert 64 to slide laterally with respect to sprue bushing 65 so that the passages through insert 64 and sprue bushing 65 are out of register. Although the spherical tip 62 moves in an arcuate path to cutoff position, the radius of such path is so relatively long, i.e., about 68 9/16" and the angular movement is so relatively small, i.e., about 0.6° for 3/4" cutoff movement, the insert 64 remains in fluid tight sealing engagement between sprue bushing 65 and nozzle 61 to thus prevent leakage of plastic material.

For effecting such movement of the nozzle 11 from the FIG. 2 shot position to the FIG. 9 cutoff position and vice versa, there is a collar member 70 around cylinder 10 which has a screw member 71 of which the head 72 is movable in a T-slot member 73 secured on die frame 3. The screw member 71 has threaded engagement with a nut 74 axially retained in the collar member 70 by a key 75. Thus, by turning the nut 74, the collar member 70 may be axially adjusted so that the end of its generally semi-circular saddle portion 76 bears on the end of the nozzle clamp nut 78 to press the tip of nozzle 11 against insert 60 to obtain the desired pre-load sealing pressure against the latter. To eliminate bending strain at the aforesaid T-slot connection, the collar member 70 has a bearing screw 79 which engages bearing plate 80 on said die frame 3, the bearing screw being locked in adjusted position by the lock nuts 81.

Referring to FIGS. 4 and 7, the die frame 3 has thereon a bracket 82 on which the double acting cylinder 83 is pivotally mounted and the piston rod 84 has mounted thereon a vertical shaft 85 with square end members engaged in a horizontal T-slot 86 through the adjacent portion of the collar member 70, and thus when the piston rod 84 moves to the left as viewed in FIG. 7, or downward as viewed in FIG. 4, the entire cylinder assembly 9 will be swung about the pivot shaft 21 to move the injection nozzle 11 to the FIG. 9 cutoff position out of register with the sprue bushing 5 and when the piston rod 84 moves in the opposite direction, the cylinder assembly will be returned to the FIG. 4 shot position wherein the nozzle 11 is aligned with the sprue bushing 5.

As most clearly shown in FIG. 7, the aforesaid bracket 82 carries a switch 87 operated (as described with reference to FIG. 11) by a flange member 89 on piston rod 84.

In the event that it is desired to service the nozzle 11 or to clean or replace the feed screw 12, the key 75 (see FIG. 7) is pulled to the left to disengage it from the groove in nut 74, whereupon the entire cylinder-feed screw assembly 9 including collar member 70 may be axially moved away from the die frame 3. Such movement of the assembly 9 to move the nozzle 11 clear of the frame 3 is effected by operating valve 90 (FIG. 11) to admit fluid under pressure into the head end of the cylinder 91 which is mounted on the feed box 32, the piston therein being axially fixed by reason of its piston rod 92 being secured to screw member 71 which is now engaged in T-slot member 73. Accordingly, the cylinder 91 moves to the right as viewed in FIG. 1, thus moving the feed box 32 along the guideways 93 together with the cylinder 10 and collar member 70, the latter being thereby disengaged from vertical shaft 85.

When the cylinder 10 has been retracted to the extent shown in FIG. 2, the handle 94 of the collar member 70 may be grasped and the entire assembly swung about the pivot shaft 21 to the FIG. 2 position, disengaging the screw member 72 from the T-slot member 73. The die frame 3 has a bracket 95 providing a guide track 96 for supporting the weight of the injection end of the cylinder 10, the collar member 70 having a ball 97 engaging such track 96 during the retraction and swinging movement of the entire assembly 9 as aforesaid. When the entire assembly 9 is swung to the FIG. 2 position, the screw member 72 disengages from the T-slot member 73 and the serviceman now can service the insert 60, and the injection nozzle 11 is exposed for cleaning or replacement simply by unscrewing the clamp nut from the cylinder.

If it be desired or necessary to remove the feed screw 12, the screw 36 at the end of the gear housing 37 will be removed, whereupon the feed screw 12 can be moved to the left to remove key means thereon and then pulled out of the cylinder 10.

After the required servicing has been accomplished the operator merely swings the cylinder assembly 9 from the FIG. 2 position to a position where the cylinder 10 is in aligned position (screw member 72 re-engaged in the T-slot member 73) and then valve 90 is operated to admit fluid under pressure into the rod end of the cylinder 91 to move the entire assembly 9 forwardly to engage the nozzle tip with the insert 60 and to engage the T-slot 86 of the collar member 70 with the shaft 85. At that time, the key 75 (FIG. 7) will be shifted to the right to re-engage it with the nut 74.

Referring now to the schematic piping and wiring diagram, FIG. 11, the operation of the machine 1 herein (starting at the beginning of the injection stroke and with motor 43 energized by closing of switch 99) is as follows:

(1) At the end of the retraction stroke of feed screw 12, the switch 100 on the gear housing 37 engages cam 101 to open the circuit through solenoid valve 51 and thus vent the hydraulic clutch 41. The resulting disengagement of clutch 41 permits centrifugal switch 50 to open as shown.

(2) The cylinder chamber 17 is now filled with plasticized material and the nozzle 11 is in the cutoff position of FIG. 9. The actuation of switch 100 by cam 101 also closes the circuit through solenoid valve 102 to conduct fluid under pressure from pump P to the rod end of cylinder 83 thus to move the nozzle 11 to shot position in register with sprue bushing 5.

(3) When the nozzle 11 is in shot position the flange 89 actuates switch 87 to energize the timer 103 and contacts in the timer (not shown) close the circuit through solenoid valve 104 to conduct fluid under pressure to the rod ends of the cylinders 58 thus to advance the feed screw 12, gear housing 37 and drive unit 42 toward the left to inject the plasticized material from chamber 17 into the mold cavity 8, the chack valve means 16 then being closed.

(4) When the timer 103 has run its adjustable time cycle to permit setting of the article in cavity 8, contacts therein (not shown) will close the circuit through solenoid valve 102 to conduct fluid under pressure into the head end of cylinder 83 thus to shift the nozzle 11 to cutoff position. At the cutoff position, the flange 89 will actuate switch 87 to open the circuit to valve 104 through timer 103 thus to vent the rod ends of the cylinders 58 and to close contacts in series with the valve 51 contacts of switch 100 and centrifugal switch 50. Thus, when the centrifugal switch is reset to close the circuit through valve 51 the drive unit 42 will rotate the feed screw 12 to feed material into chamber 17 through check valve means 16. Back pressure on the material in chamber 17 causes the feed screw 12 to be retracted whereby the cylinders 58 may be of single-acting type. Instead of a centrifugal switch 50, it is contemplated to provide a relay in the motor 43 circuit which will automatically open contacts in the circuit for the hydraulic clutch whenever the current draw of the motor 43 reaches a predetermined maximum value. In that case, the turning and retraction of the screw will commence as soon as the nozzle 11 reaches cutoff position because at that time the series clutch circuit contacts of switches 87 and 109 and of such relay will be closed.

It is to be understood that suitable hydraulic and electric circuits will be employed in connection with the opening and closing of the die blocks 4 and 6 at the proper times in relation to the operation of the cylinder-feed screw assembly 9. Examples of such circuits are disclosed in the Lester and Lester et al. Patents 2,433,132, 2,465,-889, 2,671,246, and 2,671,247.

Other modes of applying the principle of the invention may be employed, change being made as regards the details described, provided the features stated in any of the following claims, or the equivalent of such, be employed.

I therefore particularly point out and distinctly claim as my invention:

1. In a reciprocating screw injection molding machine of the type in which rotation and axial retraction of a feed screw in a cylinder advances material into a chamber between the injection nozzle of said cylinder and the forward end of said feed screw, and in which axial advance of said feed screw in said cylinder ejects the material in said chamber through said nozzle, the improvement which comprises providing a pivotal mounting for said cylinder for movement of said nozzle out of and into register respectively with a mold inlet opening during rotation and axial retraction of said feed screw and during axial advance of said feed screw, and means responsive to predetermined retraction of said feed screw to swing said cylinder about said pivotal mounting from a position whereat said nozzle is out of register with said mold inlet opening to a position whereat said nozzle is in register with said mold inlet opening.

2. An injection molding machine comprising a base having a fixed platen to which one mold block is secured and a movable platen to which another mold block is secured for movement into and out of engagement with said one mold block to define a cavity into which molten plastic material is adapted to be injected when said mold blocks are engaged and from which a molded article is adapted to be removed when said mold blocks are out of engagement; a sprue bushing in said one mold block providing a mold inlet opening through which such plastic material is injected into said cavity; a cylinder having an injection nozzle at one end in engagement with said sprue bushing; a feed screw rotatably and axially movably mounted in said cylinder and adapted, when rotated and axially retracted, to advance material plasticized thereby into a chamber between said injection nozzle and the forward end of said feed screw and, when axially advanced, to eject plasticized material in said chamber through said nozzle; pivot means for said cylinder for movement of said nozzle out of and into register respectively with said sprue bushing during rotation and axial retraction of said feed screw and during axial advance of said feed screw; and means responsive to predetermined retraction of said feed screw to swing said cylinder about said pivot means from a position whereat said nozzle is out of register with said sprue bushing to a position whereat said nozzle is in register with said sprue bushing.

3. In a reciprocating screw injection molding machine of the type in which rotation and axial retraction of a feed screw in a cylinder advances material into a chamber between the injection nozzle of said cylinder and the forward end of said feed screw, and in which axial advance of said feed screw in said cylinder ejects the material in said chamber through said nozzle, the improvement which comprises providing a pivotal mounting for said cylinder for movement of said nozzle out of and into register respectively with a mold inlet opening during rotation and axial retraction of said feed screw and during axial advance of said feed screw, said mold inlet opening and said nozzle having complemental faces in sliding engagement to preclude leakage therebetween when in and out of register.

4. The machine of claim 3 wherein the complemental faces of said mold inlet opening and said nozzle are of radius struck from the pivotal mounting of said cylinder.

5. The machine of claim 3 wherein an insert is disposed between said mold inlet opening and said nozzle for lateral sliding engagement with said inlet opening and having a spherical recess for engagement with the complemental tip of said nozzle.

6. The machine of claim 3 wherein releasable cylinder lock means fixed with respect to said mold holds said nozzle in engagement with said mold inlet opening for movement of said nozzle out of and into register with said opening, said lock means when released enabling axial retraction of said cylinder for additional swinging movement thereof so that said nozzle laterally clears said mold for servicing or replacement of said nozzle.

7. An injection molding machine comprising a base having a fixed platen to which one mold block is secured and a movable platen to which another mold block is secured for movement into and out of engagement with said one mold block to define a cavity into which molten plastic material is adapted to be injected when said mold blocks are engaged and from which a molded article is adapted to be removed when said mold blocks are out of engagement; a sprue bushing in said one mold block providing a mold inlet opening through which such plastic material is injected into said cavity; a cylinder having an injection nozzle at one end in engagement with said sprue bushing; a feed screw rotatably and axially movably mounted in said cylinder and adapted, when rotated and axially retracted, to advance material plasticized thereby into a chamber between said injection nozzle and the forward end of said feed screw and, when axially advanced, to eject plasticized material in said chamber through said nozzle; pivot means for said cylinder for movement of said nozzle out of and into register respectively with said sprue bushing during rotation and axial retraction of said feed screw and during axial advance of said feed screw; said sprue bushing and said nozzle having complemental faces in sliding engagement of preclude leakage therebetween when in and out of register.

8. The machine of claim 7 wherein releasable cylinder lock means fixed with respect to said fixed platen holds said nozzle in engagement with said sprue bushing for movement of said nozzle out of and into register with said sprue bushing, said lock means when released enabling axial retraction of said cylinder for additional swinging movement thereof about said pivot means so that said nozzle laterally clears said fixed platen for servicing or replacement of said nozzle.

References Cited
UNITED STATES PATENTS

| | | | |
|---|---|---|---|
| 2,585,204 | 2/1952 | Wondra | 18—30 |
| 3,162,900 | 12/1964 | Huelskamp | 18—12 |

WILLIAM J. STEPHENSON, *Primary Examiner.*